United States Patent [19]

Smith

[11] Patent Number: 4,995,136
[45] Date of Patent: Feb. 26, 1991

[54] CONTROL SYSTEM FOR AUTOMATIC CAR WASH BLOWER

[75] Inventor: Charles R. Smith, Erial, N.J.

[73] Assignee: Sherman Industries, Palmyra, N.J.

[21] Appl. No.: 464,248

[22] Filed: Jan. 12, 1990

Related U.S. Application Data

[63] Continuation-in-part of Ser. No. 280,125, Dec. 5, 1988, Pat. No. 4,949,423.

[51] Int. Cl.$^5$ .............................................. B60S 3/06
[52] U.S. Cl. ................................. 15/312.1; 15/316.1;
    15/319; 15/DIG. 2; 34/229; 34/243 C
[58] Field of Search .................... 15/316.1, 312.1, 319,
    15/DIG. 2; 34/229, 243 C

[56] References Cited

U.S. PATENT DOCUMENTS

| | | |
|---|---|---|
| 3,442,027 | 7/1967 | Hurwitz . |
| 3,854,054 | 12/1972 | Conn, Jr. . |
| 4,383,344 | 5/1983 | Scraggs et al. ................. 15/DIG. 2 |
| 4,559,721 | 12/1985 | Hanna . |
| 4,562,848 | 1/1986 | Messing et al. ................. 15/DIG. 2 |
| 4,587,688 | 5/1986 | Gougoulas ........................ 15/405 X |
| 4,794,938 | 1/1989 | Petit ................................ 134/123 X |
| 4,809,392 | 3/1989 | Larson et al. ................... 15/DIG. 2 |
| 4,817,301 | 4/1989 | Belanger et al. ................. 34/233 X |
| 4,934,018 | 6/1990 | Fortier et al. ................... 15/DIG. 2 |

FOREIGN PATENT DOCUMENTS 3208527 3/1982 Fed. Rep. of Germany .
1472567 1/1967 France .

OTHER PUBLICATIONS

Blueprints of Sale made to Fisher Body in Landsing Michigan, 1966.

Primary Examiner—Chris K. Moore
Attorney, Agent, or Firm—Ratner & Prestia

[57] ABSTRACT

There is provided automatic car wash equipment for positioning a forced air dryer including a blower towards vehicles being washed. The blower produces high velocity air and contains a nozzle for directing the high velocity air towards the vehicles. The blower and a positioning motor are mounted to a support frame, under which an on-coming vehicle passes. The blower is positioned according to the output signal from an ultrasonic imaging sensor mounted to the support frame. The relative position of the blower is measured by a linear potentiometer mounted to the piston which positions the blower. Additional detection devices are provided for over-riding the ultrasonic signal should contact be eminent between the blower and various parts of an on-coming vehicle.

15 Claims, 8 Drawing Sheets

FIG. 8

CONTROL SYSTEM FOR AUTOMATIC CAR WASH BLOWER

RELATED APPLICATION

This application is a continuation-in-part of application Ser. No. 07/280,125, filed Dec. 5, 1988, now U.S. Pat. No. 4,949,423, issued Aug. 21, 1990.

FIELD OF THE INVENTION

This invention relates to automatic car wash equipment and, in particular, to a system for drying rinse water from a vehicle from forced air. More particularly, the invention relates to sensing the proximity of a vehicle and for adjusting the position of a forced air nozzle.

BACKGROUND OF THE INVENTION

It is known to strip rinse water from a vehicle in a car wash. See, for example, U.S. Pat. Nos. 2,448,834 and 4,161,801. In these two patents, the nozzle through which the forced air is delivered is in contact with the vehicle surface. While this method takes advantage of the fact that the air velocity and pressure are greatest in the immediate vicinity of the nozzle, the method is subject to high maintenance costs due to wear and tear on the nozzle.

In U.S. Pat. Nos. 4,587,688 and 4,622,714, the nozzle is maintained close to, but not in contact with, the vehicle surface. In U.S. Pat. No. 4,587,688, a sonar-type of proximity detector generates signals which are sent to a control system which adjusts the position of the nozzle and maintains it in relatively close proximity to the vehicle surface. A sonar-type of proximity detector system of this type is, however, limited to angles of incidence up to about 15°, beyond which the reflected signal is not detected.

SUMMARY OF THE INVENTION

A proximity detection system which, in one preferred form, employs an ultrasonic imaging transmitter/receiver (sensor), which is fixedly mounted to the support frame of the car wash equipment. This transceiver is angled to detect the contours of an oncoming vehicle, while at the same time avoiding detection of a blower-arm assembly. The transceiver of this preferred embodiment can also be adjusted to reduce the sensitivity of its signal receiving components.

The position of the blower-arm assembly is adjusted in accordance with the imaging of the oncoming vehicle to maintain an optimum distance from the surface of the vehicle without contacting the surface of the vehicle. Adjustment and positioning of the blower-arm is accomplished by comparing the output signal from the sensor to an output signal from a linear potentiometer attached to the drive piston of the blower-arm assembly. The output signal of the linear potentiometer is directly related to the position of the nozzle end of the blower arm assembly with respect to the vehicle.

An additional, fail-safe, mechanism in the form of wheel switches may also be mounted to the blower head of the blower-arm assembly to ensure that the blower head will rise should any inadvertent contact with the vehicle surface occur. An antenna detector can also be mounted to the blower arm assembly to avoid contact with an antenna that escapes detection by the sensor.

DETAILED DESCRIPTION OF THE INVENTION

Figure 1:
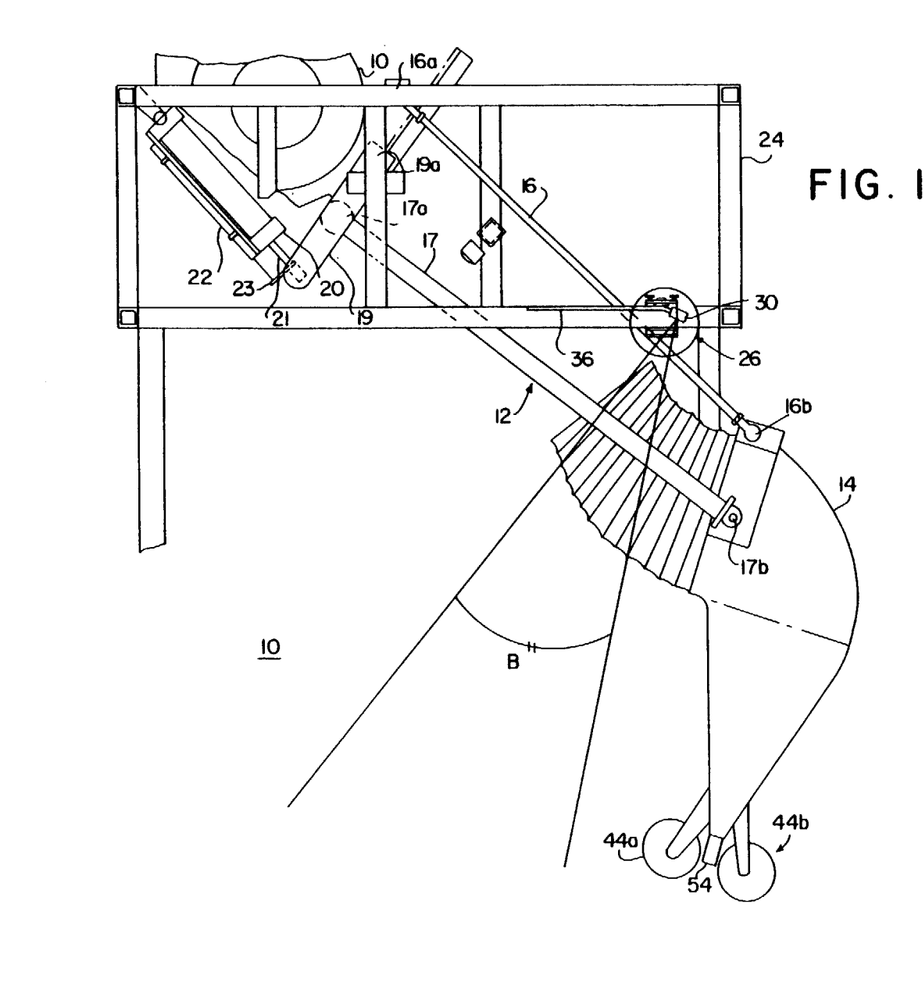
FIG. 1 is a side view of the blower-arm assembly, mounting frame and sonar transceiver embodying the present invention.

Referring now to FIG. 1, there is shown control system 10 for maintaining a blower nozzle of a blower arm assembly in close proximity to the surface of a vehicle. There is also provided a mechanism to override the imaging-based control of the blower's movement, should contact be made between the blower and the vehicle.

Control system 10 includes a blower arm assembly system 12 attached to a support frame 24 in a manner which allows blower head 14 and its attached blower nozzle 54 to move toward and away from an oncoming vehicle. In the present embodiment, blower head 14 and blower nozzle 54 are a one-piece weldment and blower arm assembly system 12 is mounted overhead of an oncoming vehicle. It is possible to mount a system such as blower arm assembly system 12 sideways, so that nozzle 54 would force air against the sides of an oncoming vehicle.

Blower system 12 includes blower head 14, with its attached blower nozzle 54, linkage arms 16 and 17 for positioning blower head 14 via a linkage 19 attached to a piston arm 21. Piston arm 21 extends from piston cylinder 20 and may be activated by either compressed air or hydraulic fluid or a combination thereof (i.e. air over oil). As piston 21 extends, member 19 mounted for pivotal movement about pivot 19a and connected to blower-head 14 through arm 17, moves blower-head 14 upward. Arm 17 is connected to blower-head 14 for pivotal movement about pivot 17b. Arm 17 is fixed to member 19. A second arm 16 is connected to blower-head 14 for pivotal movement about pivot 16b with the opposite end of arm 16 mounted for pivotal movement about pivot 16a.

The distance between pivots 16a and 17a is greater than the distance between pivots 16b and 17b. The length of arm 16 is equal to the linear distance between pivot 17b and pivot 19a. This relationship of the pivots results in the orientation of the blower-head 16 changing as the blower-head moves between its upper-most and lower-most positions. As an example, the arrangement shown in FIG. 2 can vary the nozzle orientation from between 15° to 20° from the vertical from the blower-head in the lower-most position and 5° to 7½° from the vertical with the nozzle in its upper-most position. In this way the nozzle orientation is adjusted for different top portions of the vehicle being dried. When the nozzle is over the hood, it is lower than when it is over the roof. It should be noted that the above configuration may be used with dimensions that include a true parallelogram.

Attached to the outside of piston 20 is linear potentiometer 22. One side of linear potentiometer 22 includes attachment rod 23 affixed to piston arm 21. The other side of potentiometer 22 is fixed to the cylinder of cylinder 20. As piston arm 21 extends linearly outward from piston 20, a signal is output which varies in accordance with the position of piston arm 21. This signal is directly proportional to the extension of piston arm 21 from piston 20, and corresponds to the position of nozzle 54. This output signal from linear potentiometer 22 provides information to be compared with the output signal from sensor 30.

There is also shown a sensor 30 attached to support frame 24 at area 26. (Sensor 30 and the mounting of sensor 30 to support frame 24 is shown in detail in FIG. 3).

Figure 5:
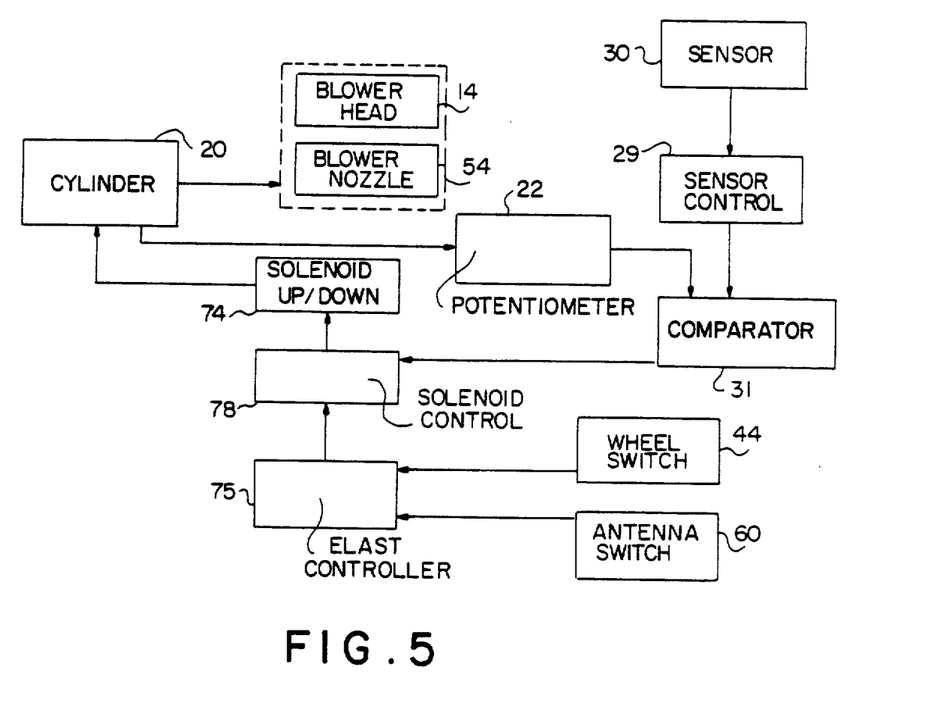
FIG. 5 is a schematic block diagram of the inputs and control box of the present invention.

Sensor 30 outputs an ultrasonic signal which reflects off of an oncoming vehicle. This reflected signal bounces back and is received by the receiving part of sensor 30. Sensor 30 sends the received signal to sensor control 29 (FIG. 5). Sensor control 29 outputs a second signal (i.e. a voltage signal) which relates to the distance of the oncoming vehicle to sensor 30. This output signal from sensor 30 is then compared to the output signal from linear potentiometer 22, and a resultant control signal is then applied to solenoid control 78. Solenoid control 78 then signals solenoid 74 to pressurize or depressurize piston cylinder 20 to properly position nozzle 54 in close proximity to the surface of oncoming vehicle 5.

Wheel switches 44a and 44b (wheel switches 44a and b are shown in greater detail in FIGS. 6 and 7) are mounted on the front and rear portions of blower head 14 to serve as a fail-safe mechanism. Wheel switches 44 are attached to blower head 14 by mounting arms 46. Wheel switches 44 serve as fail-safe mechanisms so that if a portion of an automobile escaped detection by sensor 30, or if sensor 30 was not functioning properly, contact with the oncoming vehicle by blower nozzle 54 can be avoided.

Wheel switches 44a and 44b are positioned so that imminent contact with nozzle 54 would first result in contact with either wheel switch 44a or 44b, depending on whether the contact point is in front of or behind nozzle 54 (relative to the direction of travel of car 5). When this contact occurs, an override signal is transmitted to solenoid 74 and solenoid control 78, causing piston arm 21 to further extend from piston 20, thus raising blower head 14 to a position where contact (with car 5) is no longer made. In the present embodiment, nozzle 54 can move approximately 90 inches above the floor upon a signal from the wheel switches 44, antenna switch 60 or sensor control 29. In comparison, if nozzle 54 is fully descended, in the present embodiment, it is approximately 42 inches above the floor.

Wheel switches 44a and 44b operate to override or bypass the signal from sensor 30 through a relay control system in controller 75 of FIG. 5. Thus, the wheel switches control relays which are either ON or OFF. When OFF, the signal from sensor 30 is controlling. When ON, the signal from sensor 30 is bypassed and a signal to solenoid 74 and solenoid control 78 causes pressurization of piston cylinder 20 and the actuation of piston arm 21, which raises blower head 14 and its attached blower nozzle 54.

Figure 2:
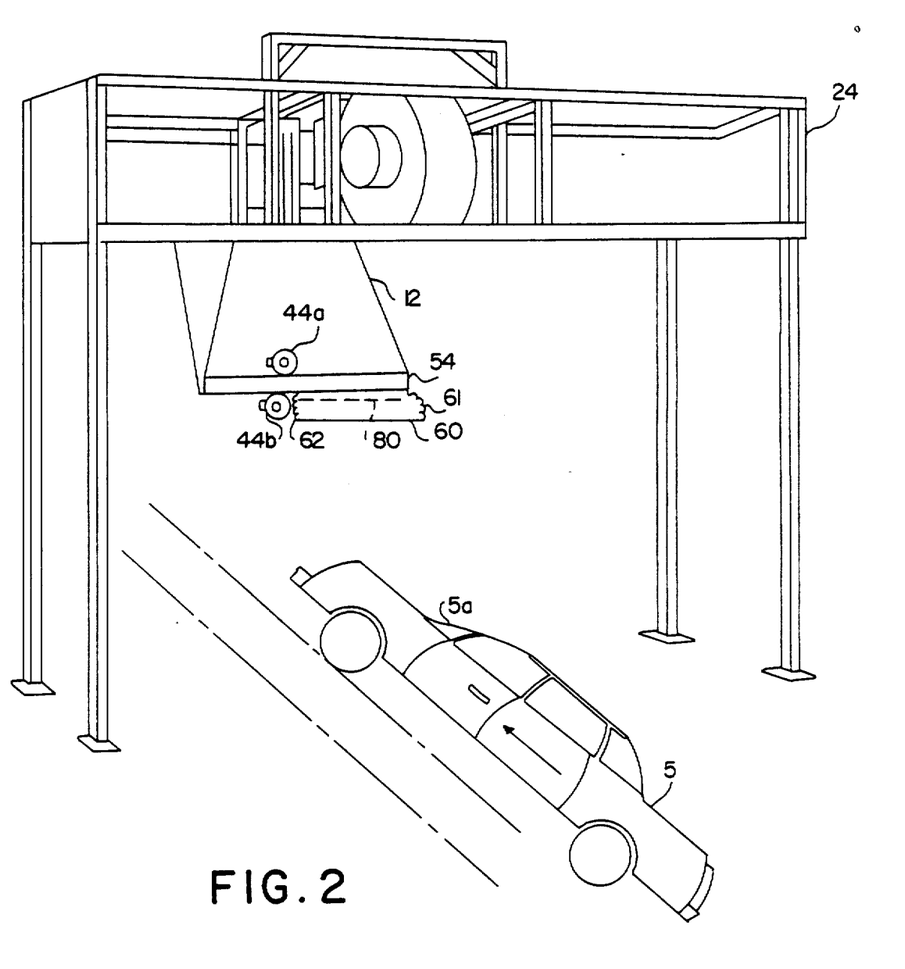
FIG. 2 is a diagrammatic illustration of automatic car wash equipment embodying the present invention.

There is shown in FIG. 2 a diagrammatic illustration of blower assembly 12 mounted on frame 24 with a vehicle 5 approaching blower assembly 12. Nozzle 54 of blower assembly 12 is positioned to trace the contours of the upper surface of vehicle 5, such as the hood, windshield, roof, rear window and trunk.

An additional feature, which may be present, in control system 10 is an antenna detection component. This antenna detection component is shown in FIG. 2 as nylon cord 60 and spring switches 61 and 62. An alternate antenna detector 80 (see FIG. 8) having a plastic flap 55 with a conductive contact material 57 may also be used. A conductive tape could serve this purpose. Nylon cord 60 is attached in the front (portion facing the approaching vehicle) of blower nozzle 54. Nylon cord 60 is attached to nozzle 54 by spring switches 61 and 62. The antenna detectors of the present invention are positioned on the side of blower nozzle 54 which corresponds to the typical placement of antennas on automobiles. Those skilled in the art will understand that the antenna detectors can be placed at any point on nozzle 54, or across the active length of nozzle 54.

When spring switches 61 or 62 are engaged by either a compression or extension, contact is made with a switch element (not shown) which, in turn, switches a relay in Elast Controller 75 to an "ON" state (similar to the operation of relays for wheel switches 44a and 44b), causing blower nozzle 54 to be raised away from the antenna which triggered the signal. This signal activates a relay control system in Elast Controller 75 and overrides the ultrasonic imaging currently taking place.

When an override signal from either the wheel switches or the antenna detector occurs and blower head 14 and nozzle 54 are raised to a position where contact (with oncoming car 5) is no longer made, a delay timer (located in solenoid control 78, FIG. 5) is also activated for reengaging the ultrasonic imaging and repositioning blower nozzle 54. In the present embodiment, a delay timer can be set for between 0 and 5 seconds with a one-second delay currently being used. The delay mechanism allows for the blower to be repositioned through ultrasonic imaging by sensor 30 after the blower head and nozzle are raised for a sufficient time to let the surface causing the contact pass under the blower head. When the delay cycle is over, the relays (located in solenoid control 78, FIG. 5) for either the wheel switches or the antenna detector are reset.

Figure 3:
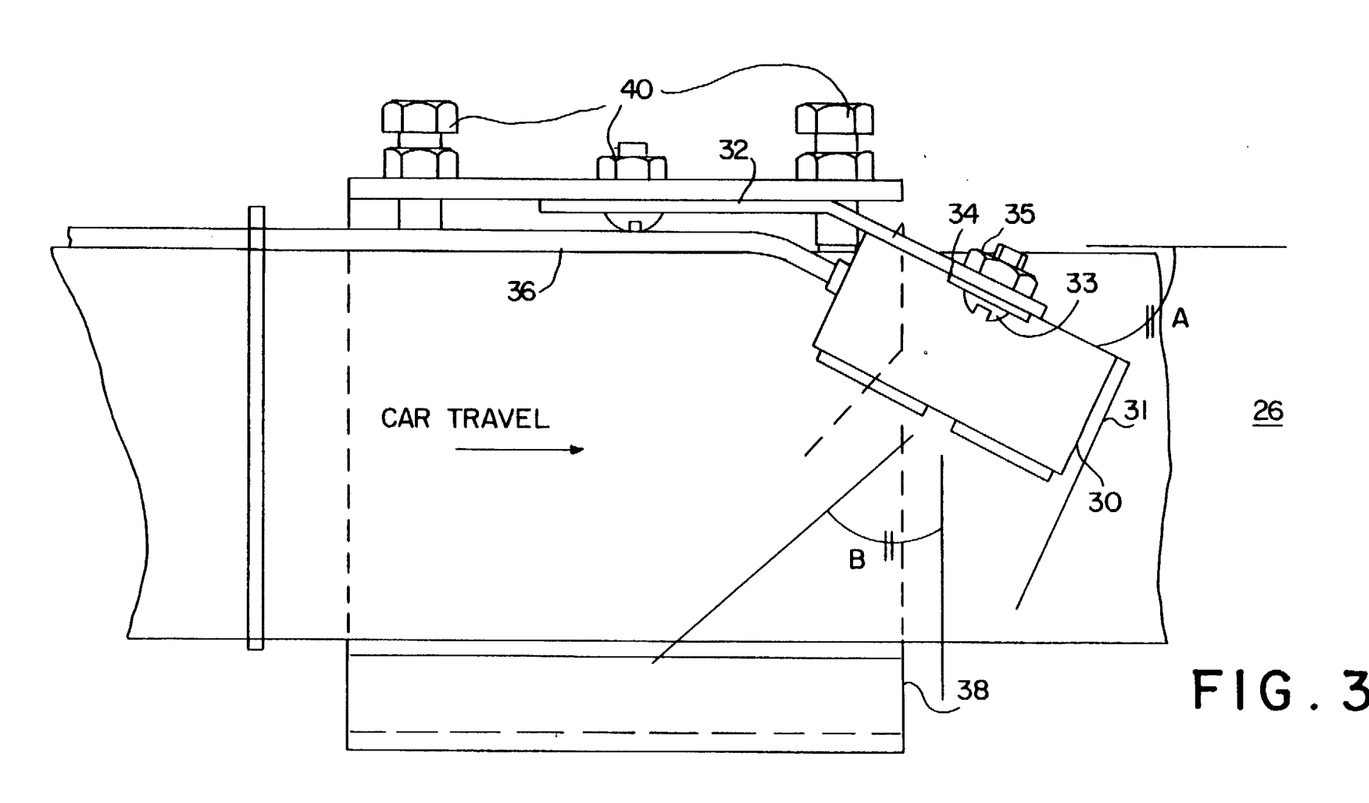
FIG. 3 is an expanded view of the sonar transceiver and mounting apparatus of the present invention.

There is shown in FIG. 3 sensor mount 26, which contains the mounting means and the ultrasonic imaging sensor 30, Migatronics Model #RPS-200-72-500 in the present embodiment). Sensor 30 is an ultrasonic imaging transducer containing components for the transmission of an ultrasonic signal and also the reception of a signal reflected off of an object within its imaging window. The sensor of the present embodiment receives signals which fall within an imaging window of 36° (shown as angle B in FIG. 3).

Scaling of the sensor (reducing the sensitivity) can adjust the imaging window to avoid detection of blower nozzle 54 working in the sensing window, while still detecting the car. For the sensor of the present embodiment, avoidance of blower nozzle 54 occurs when the imaging window is reduced from 36° to approximately 20°. This 20° imaging window effectively avoids detection of the blower assembly 12 when sensor 30 is angled at 15° (angle A, FIG. 3) because the angle of incidence from sensor 30 to nozzle 54 allows most of the signal to miss the receiver (of sensor 30). The remaining signal from nozzle 54 to sensor 30 is of insufficient amplitude to be validated by sensor 30. Unvalidated signals are suppressed and do not affect the output signal of sensor 30.

Two factors have been found to substantially affect the placement and adjustment of sensor 30 for the proper imaging of the oncoming vehicle. The first factor involves avoidance of detection of blower assembly 12. The second factor involves complete imaging of the oncoming vehicle including its angled windshield.

For the present embodiment, it has been found that a combination of angling the sensor to face the oncoming vehicle and reducing the imaging window of sensor 30 addresses both factors and provides for the proper imaging of the oncoming vehicle.

In a horizontal position, sensor 30 may be positioned parallel to the horizontal (i.e. angle A is 0°). In this position, it has been found that reducing the imaging window of sensor 30 to approximately 20° effectively avoids detection of the blower assembly 12, as shown in FIG. 1. The imaging window of sensor 30 is reduced by applying a protective film or sheet in the path of the line of sight between sensor 30 and nozzle 54. Film 31 reduces the sensitivity of sensor 30 (acting as a waveguide), substantially eliminating signals from the blower assembly. The sensitivity of sensor 30 can also be reduced or controlled by other means, such as a potentiometer. As is well known in the art, a potentiometer could control the receiving or transmitting components of sensor 30 and thus reduce its sensitivity. In the present embodiment, the protective film 31 has been found to be both easy to use and highly effective.

Still considering Angle A at 0° and reducing the imaging window of sensor 30, however, introduces the second factor—effective imaging of the slanted automobile windshield 5a, FIG. 2. The reduced angle of the imaging window directs the signal at an angle towards the windshield of an oncoming vehicle in such a manner that it is reflected away from sensor 30. By reflecting the signal away from sensor 30, sensor 30 does not detect the windshield. By failing to detect the windshield, sensor 30 cannot output a signal to control the blower assembly, preventing proper control of the blower assembly.

In order to effectively image the windshield, sensor 30 is angled so that the ultrasonic signal sent towards the windshield will bounce back towards sensor 30. In the present embodiment, sensor 30 is angled so that angle A is approximately 15°. Angling sensor 30 at approximately 15° yields effective and complete imaging of the oncoming automobile while at the same time avoiding detection of the blower arm assembly. Effective imaging (to sense both windshield and the hood) by sensor 30 can be accomplished when sensor 30 is angled at approximately one half of the inside angle (the angle made up of the interior windshield and the horizontal) of the automobile windshield. Angling sensor 30 at 15° is a practical compromise to compensate for different angles encountered on the hood, windshield, top and rear deck.

Sensor 30 is mounted to support frame 24 by mounting brackets 38 and 32. Mounting bracket 38 can be welded to support frame 24, and mounting bracket 32 is attached by various mounting means. In FIG. 3, nuts and bolts 40 are shown to attach mounting bracket 32 to support frame 24. Sensor 30 is attached to mounting bracket 32 by bolt 33, washer 34 and nut 35. The output and power lines for sensor 30 are contained within conduit 36. Conduit 36 leads the output line of sensor 30 to the control box of the present invention.

Figure 4:
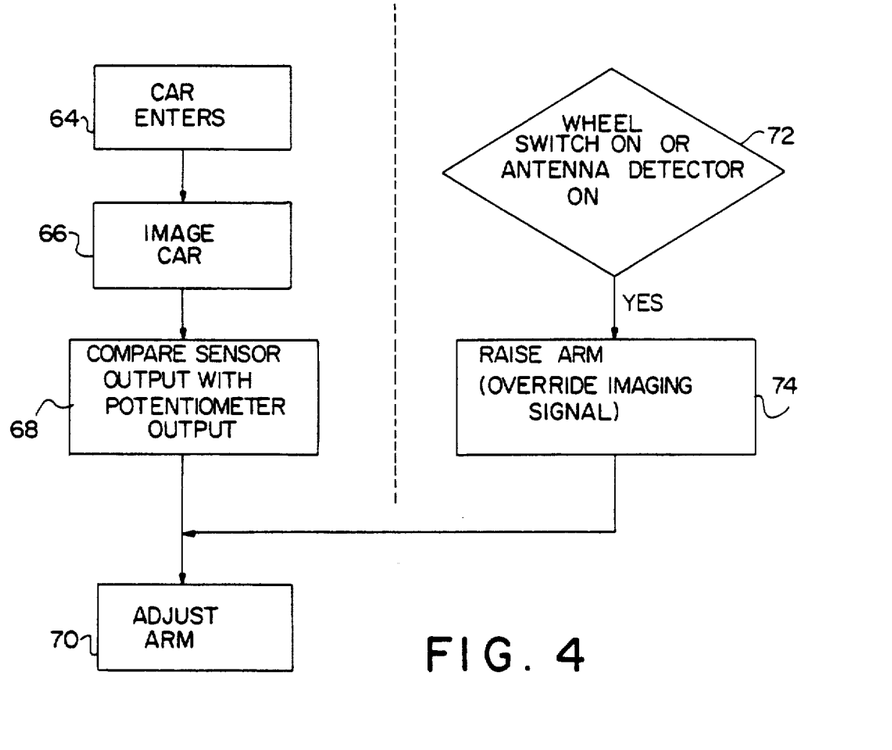
FIG. 4 is a logical block diagram of the operation of the automatic car wash apparatus embodying the present invention.

There is shown in FIG. 4 a block diagram of the operation of the present invention. A vehicle enters the car wash blower region as shown in block 64. The vehicle is imaged by the imaging mechanism of sensor 30, as shown in block 66. The sensor output from sensor 30 is compared with the output of linear potentiometer 22, as shown in block 68. After this comparison of signals is made, the blower assembly is raised or lowered to position blower nozzle 54 in close proximity to the surface of the oncoming vehicle. Blocks 72 and 74 show the override function of the present invention. Decision block 72 determines whether the wheel switch is ON, as indicated by the state of a relay in Elast controller 75 of FIG. 5. This relay is normally OFF until an override signal is sent from the wheel switches or an antenna detector. Should this override signal be sent, the relay is switched to the ON position and overrides the imaging signals of the vehicle. This causes the blower arm to rise to a position where contact (with car 5) is no longer made, as shown in block 74. The blower will remain in the non-contact position as long as the timing delay is set. The delay is set for one second in the present embodiment.

Decision block 72 determines whether the antenna detector is ON. The relay works similar to that of the wheel switch in that it is OFF until a signal from the antenna detector trips the relay to the ON position. At this point, the ultrasonic imaging signal is overridden, and the blower arm would raise, as shown in block 74.

There is shown in FIG. 5 a schematic block diagram for the control and operation of the present invention. Ultrasonic sensor 30 outputs a signal to sensor control 29 which outputs a signal to comparator 31. Comparator 31 compares the signal from sensor control 29 and the signal from potentiometer 22. Potentiometer 22 outputs a signal relative to the extension of piston 21. Comparator 31 then outputs a signal to solenoid control 78 which controls solenoid 74. Solenoid 74 in turn, controls blower head 14 and blower nozzle 54 through cylinder 26.

Solenoid 74 outputs a signal to activate cylinder 20 which in turn moves piston arm 21 (not shown) to position blower 14 and by implication blower nozzle 54. The extension of piston 21 corresponds to the position of the blower-nozzle 54 relative to the vehicle.

Solenoid control 78 can receive an over-ride signal from Elast (Extremely Low Amperage Switch Terminator, Cratar Model #106) controller 75. Elast controller 75 contains a relay activated by wheel switches 44a and 44b and antenna switch 60. Additional relay circuitry and finer circuitry is contained in solenoid control 78, as is understood by those skilled in the art. Activation of Elast controller from either wheel switch 44a and 44b or antenna switch 60 generates and over-ride signal, which is set to solenoid control 78 and over-rides the signal from Comparator 31. The effect of the over-ride signal is to raise blower nozzle 54 away from oncoming vehicle 5. The raised nozzle is on a timed basis. The timer is located in solenoid control 78 and when the timing cycle is complete, blower nozzle 54 is once again positioned according to the comparison of the output signal from ultrasonic sensor 30 and the output from potentiometer 22.

Figure 6:
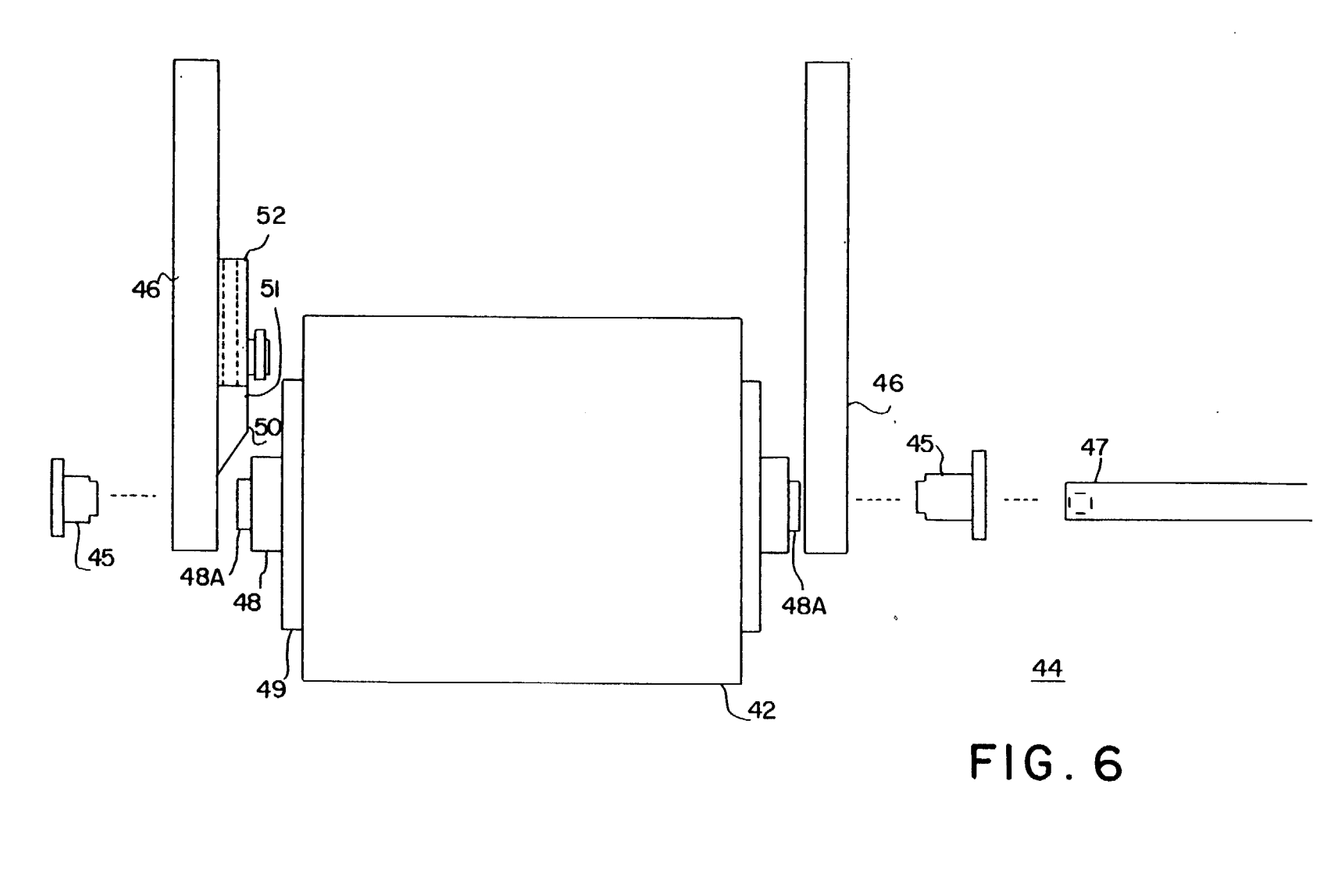
FIG. 6 is an exploded view of the wheel switch.

There is shown in FIG. 6 an expanded view of wheel switch 44 (shown in FIG. 1 as 44a and 44b). Wheel switch 44 is comprised of wheel 42 mounted to support mounts 46. Wheel 42 can be made of any number of substances such as rubber or plastic or compounds thereof. Wheel 42 is attached to support mounts 46 by rod 47, non-conducting bushing 45 and non-conducting shim 49. Rod 47 may be made of a conducting substance such as aluminum while bushing 45 should be made of a non-conducting material such as nylon. Wheel switch 44 is activated when a portion of an oncoming vehicle makes contact with wheel 42. Wheel 42 pushes nut 48 (or pipe 48a) into contact with spring contact 50. Spring contact 50 is mounted to support means 46 by non-conducting spring mount 52 and screw 51. A wire connected to spring contact 50 at screw 51 transfers the electrical contact signal to the control means in order to raise blower nozzle 54 away from oncoming vehicle 5. The signal is generated by the contact between nut 48 (or pipe 48a) and spring contact 50 by grounding spring contact with support frame 46.

Figure 7:
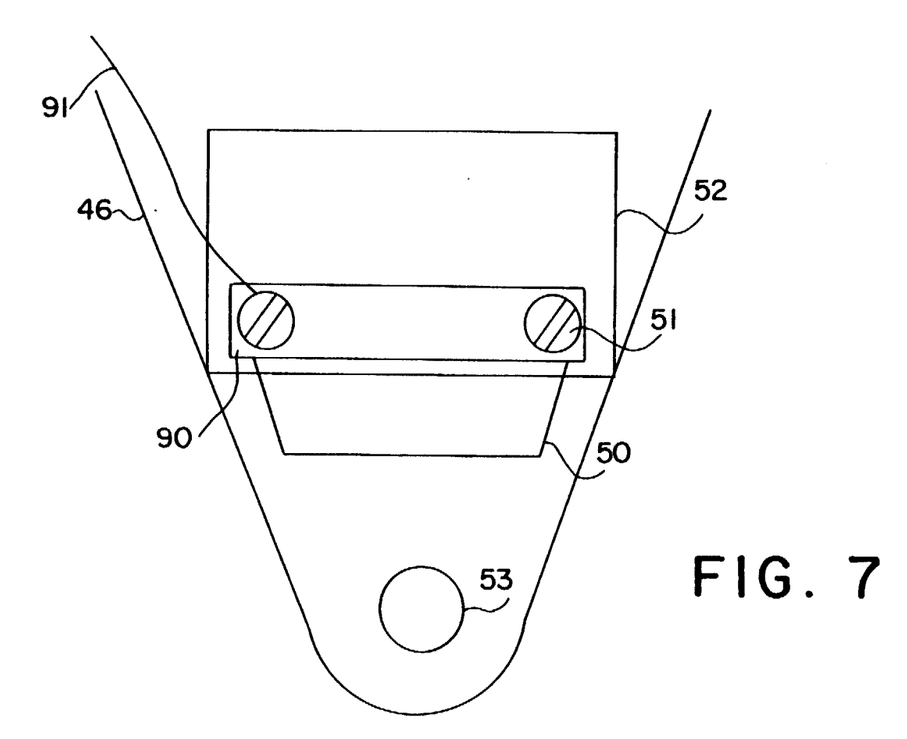
FIG. 7 is a partial side view of the wheel switch.

There is shown in FIG. 7, support means 46, containing non-conducting spring support 52, spring contact 50, screws 51, keeper 90 and wire 91.

Keeper 90 is made of stainless steel in the present embodiment, but other conductive materials could be used. Keeper 90 prevents spring contact 50 from deforming, as well as providing contact to wire 91. Wire 91, in turn, is connected to Elast controller 75 (FIG. 5). Spring contact 50 is also made of stainless steel in the present embodiment.

In a further embodiment of the invention it will be understood that sensor 30 may be mechanically coupled to blower-head 14 as described in Ser. No. 07/280,125, filed Dec. 5, 1988 and assigned to the same assignee as this application. Thus, in this further embodiment the distance between pivots 16a and 17a is greater than the distance between pivots 17b and 17b.

Figure 8:
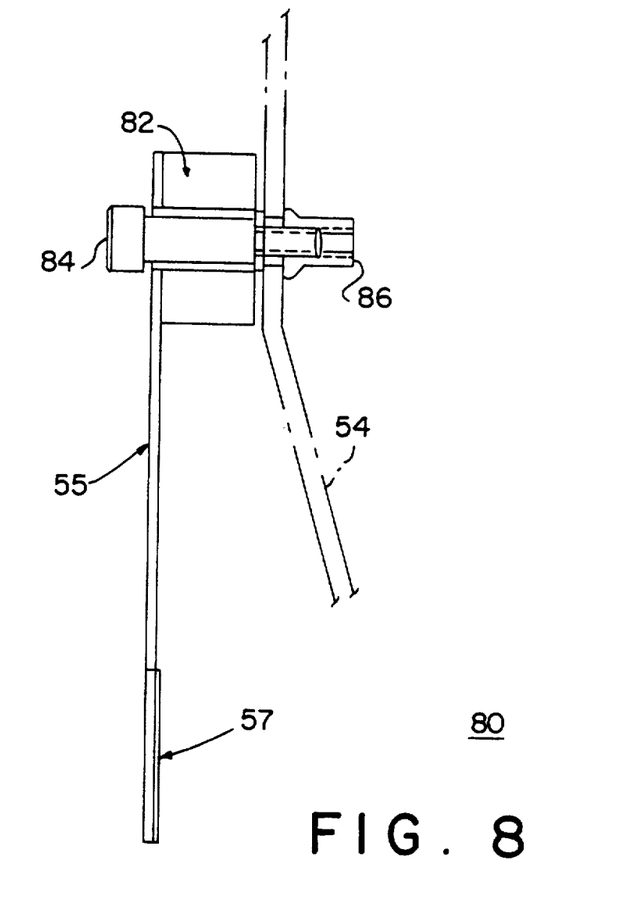

There is shown in FIG. 8 a more detailed view of flap antenna detector 80. Antenna detector 80 is an alternate antenna detector design. Antenna detector 80 has conductive contact strip 57 attached to flap 55. Flap 55 is secured to nozzle 54 by bolt 84 and rivnut 86. Sponge strip 82 "resets" flap 55 after deflection into nozzle 54 by the antenna of oncoming vehicle 5. Contact between contact strip 57 and nozzle 54 send a signal along a wire (not shown) to Elast controller 75 (FIG. 5).

What is claimed is:

1. Automatic car wash equipment comprising:
   (a) a forced-air dryer including a blower for producing high velocity air and a nozzle for directing said high velocity air toward vehicles being washed;
   (b) support means for mounting said forced-air dryer above a path followed by said vehicles to direct said high velocity air from said nozzle to surfaces of said vehicles;
   (c) drive means for moving said nozzle along a path toward and away from said vehicles;
   (d) imaging means fixedly mounted to said support means
      (1) for beaming a first signal toward the vehicle being dried, said vehicle producing a reflected second signal; and
      (2) for receiving said reflected second signal;
   (e) means for comparing said first signal to said second reflected signal and producing an output signal representative of the position of said vehicle;
   (f) means for measuring the position of the blower nozzle relative to the vehicle and producing a position signal corresponding to the relative position of the blower nozzle; and
   (g) means responsive to said output signal and said position signal for controlling said drive means to position said blower and blower nozzle in a predefined close proximity range of said vehicle.

2. The automatic car wash equipment of claim 1, further comprising
   switching means for outputting an override signal to said control means when said switching means are activated, said override signal causing said control means to activate said drive means and move said blower away from said vehicle;

3. The automatic car wash equipment of claim 2 wherein said switching means is a wheel switch.

4. The automatic car wash equipment of claim 3 wherein said wheel switch is mounted on said blower.

5. The automatic car wash equipment of claim 2 wherein said switching means is an antenna detector.

6. The automatic car wash equipment of claim 5 wherein said antenna detector is comprised of a nylon cord and at least one spring-activated switch.

7. The automatic car wash equipment of claim 5 wherein said antenna detector is comprised of a plastic flap, said flap comprising a conductive contact surface.

8. The automatic car wash equipment of claim 1 wherein said transmitter means and said receiver means comprise an ultrasonic imaging system.

9. The automatic car wash equipment of claim 8 further comprising
   means for reducing the sensitivity of the ultrasonic imaging system to avoid detecting said nozzle during the travel of said nozzle.

10. The automatic car wash equipment of claim 9 wherein said means for reducing the sensitivity comprises a covering which prevents detection of said nozzle by said ultrasonic imaging system from moisture.

11. The automatic car wash equipment of claim 8 wherein said means for reducing the sensitivity provides an imaging window of said ultrasonic imaging system to approximately 20°.

12. The automatic car wash equipment of claim 1 wherein said imaging means is mounted to said support frame at an angle of substantially 15°.

13. The automatic car wash equipment of claim 1 wherein said receiving means are positioned to avoid detection of said blower.

14. The automatic car wash equipment of claim 1 wherein said measuring means comprise a linear potentiometer.

15. The automatic car wash equipment of claim 14 wherein said linear potentiometer is mounted on a piston cylinder.

* * * * *